Patented Mar. 26, 1940

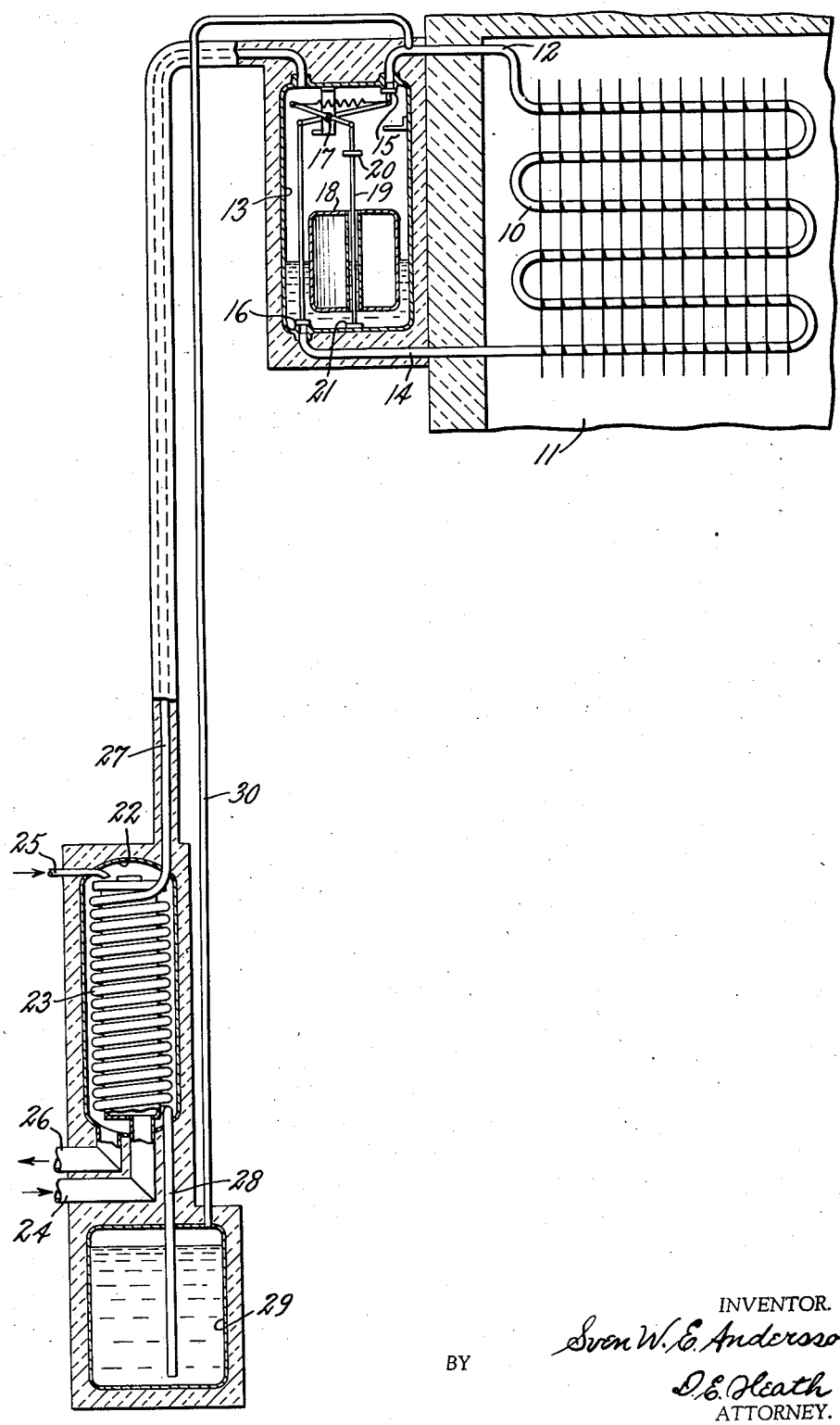

2,195,293

UNITED STATES PATENT OFFICE 2,195,293

REFRIGERATION

Sven W. E. Andersson, Evansville, Ind., assignor to Servel, Inc., New York, N. Y., a corporation of Delaware Application October 19, 1938, Serial No. 235,757

3 Claims. (Cl. 62—125)

My invention relates to a heat transfer system making use of evaporation and condensation of fluid and it is an object of the invention to provide such a system for transfer of heat downward and utilizing pressure of vapor produced by vaporization effective in the heat transfer to raise liquid in the system as more fully described and explained in the following description in connection with the accompanying drawing of which the single figure shows more or less diagrammatically a heat transfer system for transferring heat downward to refrigeration apparatus and embodying the invention.

An evaporator coil 10 is located in a refrigerator compartment 11. The upper end of coil 10 is connected by a conduit 12 to the upper part of a control vessel 13. The lower end of coil 10 is connected by a conduit 14 to the lower part of control vessel 13. A valve 15 controls communication of conduit 12 with control vessel 13. A second valve 16 controls communication of conduit 14 with control vessel 13. Valves 15 and 16 are opened and closed together by a spring toggle mechanism 17. A float 18 in control vessel 13 is loosely slideable on a rod 19 between an upper stop 20 and a lower stop 21. Rod 19 is connected to shift the valve operating toggle mechanism 17.

At a place below the level of evaporator coil 10, as for instance, the basement of a building in which the refrigerator 11 is on an upper floor, is located refrigeration apparatus including a cooling element 22. The refrigeration apparatus may be like that described in an application Serial No. 107,852 of Albert R. Thomas. In the cooling element 22 is a pipe coil 23. Inert gas flows into the cooling element or evaporator 22 through a conduit 24. Liquid refrigerant flows into evaporator 22 through a conduit 25. Liquid refrigerant flows downward over coil 23 and evaporates and diffuses into the inert gas producing a refrigerating effect for cooling the coil 23. The resulting vapor and gas mixture leaves the evaporator through a conduit 26.

The upper end of coil 23 is connected by a conduit 27 to the upper part of control vessel 13. The lower end of coil 23 is connected by a conduit 28 to the lower part of a reservoir or storage vessel 29. The upper part of vessel 29 is connected by a conduit 30 and conduit 12 to the upper end of evaporator coil 10. The coils 10 and 23 together with their interconnecting conduits and vessels constitute a vaporization-condensation system which contains a suitable heat transfer fluid which vaporizes in coil 10 and condenses in coil 23 during operation of the system.

In starting, when all of the system is at room temperature, liquid is practically all in the lower vessel 29. In control vessel 13, the float 18 is down and valves 15 and 16 are closed, thus segregating coil 10 from the control vessel 13. Upon operation of the refrigeration apparatus vapor is cooled and condensed to liquid in coil 23. The collapse of vapor in coil 23 decreases the pressure in this coil and also in conduits 28 and 27 and control vessel 13. Since the lower end of conduit 28 is sealed by liquid in vessel 29, and evaporator coil 10 is cut off by valves 15 and 16, the lowering of pressure in coil 23 creates a pressure differential which causes liquid to rise in vessel 29 through conduit 28, coil 23, and conduit 27 into control vessel 13.

As liquid rises in control vessel 13, float 18 rises into engagement with stop 20 and then raises rod 19 to shift toggle 17 to open valves 15 and 16. Liquid flows from vessel 13 into coil 10 and there vaporizes to produce cooling of air in the refrigerator compartment 11. The vapor flows from the upper end of coil 10 through conduit 12, control vessel 13 and conduit 27 to condenser coil 23. Vapor condenses to liquid in coil 23 and the liquid flows downward through conduit 28 into vessel 29. The liquid level in control vessel 13 recedes and float 18 descends into engagement with stop 21 and carries rod 19 downward to shift toggle mechanism 17 to close valves 15 and 16, again segregating coil 10 from control vessel 13. Liquid continues to vaporize in coil 10 at increasingly higher pressures which are communicated through conduit 12 and conduit 30 into vessel 29 above the liquid level therein. As this pressure increases, liquid is forced from vessel 29 upward through conduit 28, coil 23, and conduit 27 into control vessel 13. As liquid rises in vessel 13 the float 18 is carried upward to shift the valve operating toggle mechanism to open valves 15 and 16, and the cycle is repeated.

The valves 15 and 16 are shown diagrammatically. These valves should preferably seat in the opposite direction so that pressure difference will tend to seat rather than unseat these valves. Various other changes and modifications may be made within the scope of the invention which is not limited except as indicated by the following claims.

What is claimed is:

1. A heat transfer system including a circuit for heat transfer fluid having a place of vaporization at an upper elevation, a place of condensation at a lower elevation, a vessel for accumulating liquid below said place of condensation, a conduit from the lower part of said vessel below the surface level of liquid therein to said place of vaporization at said upper elevation, said conduit including said place of condensation, and means for intermittently trapping vapor from said place of vaporization above said surface level of liquid in said vessel to cause alternate upward flow of liquid in said conduit from said vessel and downward flow of condensate from said condenser into said vessel.

2. A heat transfer system including a circuit for heat transfer fluid having an upper vessel, an evaporator connected to receive liquid from said upper vessel, a condenser connected to receive vapor from said evaporator, a lower vessel connected to receive vapor from said evaporator and liquid from said condenser, a conduit extending from the lower part of said lower vessel to said upper vessel, said condenser being included in said conduit, and means for intermittently segregating said evaporator from said upper vessel so as to cause a pressure difference between said upper and lower vessels whereby liquid in said lower vessel flows upward through said conduit to said upper vessel.

3. Heat transfer system as set forth in claim 2 in which said segregating means is operative responsive to variation in liquid level in said upper vessel.

SVEN W. E. ANDERSSON.